United States Patent [19]
Mahurin

[11] Patent Number: 6,041,341
[45] Date of Patent: Mar. 21, 2000

[54] METHOD AND CIRCUIT FOR ADDING OPERANDS OF MULTIPLE SIZE

[75] Inventor: Eric W. Mahurin, Austin, Tex.

[73] Assignee: Advanced Micro Devices, Inc., Sunnyvale, Calif.

[21] Appl. No.: 09/057,138

[22] Filed: Apr. 8, 1998

[51] Int. Cl.⁷ ..................................................... G06F 7/50
[52] U.S. Cl. .......................................... 708/700; 708/518
[58] Field of Search ................................... 708/518, 670, 708/70 D, 706, 707, 710, 714

[56] References Cited

U.S. PATENT DOCUMENTS

| | | | |
|---|---|---|---|
| 5,249,148 | 9/1993 | Catherwood et al. | 708/491 |
| 5,511,017 | 4/1996 | Cohen et al. | 708/491 |

*Primary Examiner*—Chuong Dinh Ngo
*Attorney, Agent, or Firm*—Conley, Rose & Tayon, P.C.; Eric A. Stephenson

[57] ABSTRACT

A circuiting method is disclosed for adding operands of multiple size. This circuit and method employ an n bit adder having n first and second inputs. A first m bit operand is inputted into the m least significant first inputs of the adder, where n is greater than m. A second m bit operand is inputted into the m least significant circuit inputs of the adder. A first (n-m) bit operand is inputted into the (n-m) most significant first inputs of the adder. Each bit of the first (n-m) bit operand represents logical 0. A second (n-m) bit operand is inputted into the most significant (n-m) second inputs of the adder. Each bit of the second (n-m) bit operand represents a logical 1. The first and second m bit operands, the first and second (n-m) bit operands and a carry in bit provided to a carry input node of the adder, are all inputted in parallel. In response, the adder generates n carry bits and n bit output operand. The least significant m bits of the n bit output operand and the most significant carry bit of the n carry bits represent the result of adding the first and second m bit operands and the carry in bit.

15 Claims, 3 Drawing Sheets

METHOD AND CIRCUIT FOR ADDING OPERANDS OF MULTIPLE SIZE

BACKGROUND OF THE INVENTION

1. Field of the Invention

This invention relates to adders and more particularly to a circuit and method for adding operands of multiple sizes.

2. Description of the Relevant Art

Microprocessors determine the speed and power of personal computers, in a growing number of more powerful machines, by handling most of the data processing in the machine. Microprocessors typically include at least three functional groups: the input unit (I/O unit), the control unit, and the arithmetic logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

An essential component of any ALU is the adder circuit. The adder circuit performs addition operations on two or more input operands. Because the addition operation is one of the most commonly invoked operations during the execution of a computer program, the speed with which the adder circuit can compute the sum of two input operands is extremely important in determining the speed of the overall system.

Several common adder circuits are well known in the field of digital logic. A ripple carry adder, for example, adds two (or possibly more) operands in much the same manner as a person would add two numbers. The least significant bit of the first operand is added to the least significant bit of the second operand (and possibly a carry in bit) to produce a least significant result bit and a least significant carry bit. The least significant carry bit is then added to the next most significant bit of the first operand and the next most significant bit of the second operand to produce a next most significant result bit and a next most significant carry bit. This sequence continues until, eventually, the most significant bits of the operand have been added together with the carry bit from the preceding stage to produce the most significant result bit and a carry out bit. The carry out bit of the ripple carry adder can be used as a carry in bit to a subsequent adder such that the multiple ripple through adders can be connected together in series.

Carry lookahead adders are also well known in the art. Carry lookahead adders operate faster than ripple carry adders. As a result, carry lookahead adders are preferred in ALU design. Carry lookahead adders employ a carry lookahead circuit in which each carry bit can be generated as a function of the operand bits and the carry input bit. Namely, the carry lookahead circuit operates in accordance with the following equations:

$$c_{i+1} = g_i + p_i c_i \quad (1)$$

$$g_i = a_i b_i \quad (2)$$

$$p_i = a_i + b_i \quad (3)$$

Where $c_{i+1}$ represents the carry bit of an $i^{th}$ stage and $a_i$ and $b_i$ represent the $i^{th}$ bits of the operands to be added. It is readily seen that if $g_i$ is true in Equation (1) then $c_{i+1}$ is certainly true and a carry bit is generated. If $p_i$ is true then if $c_i$ is true then it is propogated to $c_{i+1}$. Each sum bit $s_i$ of an adder can be represented as:

$$s_i = a_i \bar{b}_i \bar{c}_i + \bar{a}_i \bar{b}_i c_i + \bar{a}_i b_i \bar{c}_i + a_i b_i c_i. \quad (4)$$

From equations (1)–(4) each carry bit generated by the carry lookahead circuit can be represented as follows:

$$c_{i+1} = g_i + p_i g_{i-1} + p_i p_{i-1} g_{i-2} + \ldots + p_i p_{i-1} \ldots p_1 g_0 + p_i p_{i-1} \ldots p_1 p_0 c_{in}. \quad (5)$$

FIG. 1 shows a prior art adder circuit 10 configured to add operands of multiple sizes. More particularly, an adder circuit 10 is configured to add first and second four bit or eight bit operands. Adder circuit 10 is configured as a carry lookahead adder employing a carry lookahead circuit 12 operating in accordance with equation (5). Adder circuit 10 further includes a first set of XOR gates 14 and a second set of XOR gates 16. Each of the XOR gates of the first and second set includes a pair of inputs and an output. Each XOR gate 14 is coupled to receive a pair of corresponding bits from first and second input operands ($a_{8:1}$ and $b_{8:1}$). Each XOR gate 16 is coupled to receive the output of an XOR gate 14 and a carry bit $c_i$ from carry lookahead circuit 12.

Adder circuit 10 finally includes a multiplexer 18 having a pair of inputs, a selector input and carry output coupled to a carry output node 20. One input of multiplexer 18 is coupled to receive the most significant carry bit ($c_8$) provided by carry lookahead circuit 12. The second input of multiplexer 18 is coupled to receive the fourth least significant carry bit ($c_4$) of carry lookahead circuit 12. The select input of multiplexer 18 is configured to receive a first or second control signal. Multiplexer 18 receives the first control signal when adder circuit 10 is directed to add first and second four bit operands. Multiplexer 18 receives a second control signal when adder circuit 10 is directed to add first and second eight bit operands. In each mode, carry lookahead circuit generates eight carry bits $c_{8:1}$. When adder circuit 10 is directed to add first and second eight bit operand, $c_8$ represents the carry out bit to be forwarded to subsequent circuitry such as a second adder circuit (not shown). However, when adder circuit 10 is directed to add first and second four bit operand, $c_4$ represents the carry out bit to be forwarded to subsequent circuitry.

In the second mode of operation, first and second eight bit operands are provided to the first and second inputs of the carry lookahead circuit 12. Carry lookahead circuit 12 generates eight carry bits ($c_{8:1}$) as a function of the eight bit input operands and a carry input bit received at carry input node 22. XOR gates 16 generate an eight bit result from the eight carry bits and the outputs of XOR gates 14. In this mode, the second signal is inputted to multiplexer 18 which causes the most significant carry ($c_8$) bit to be passed to carry output node 20.

In the first mode of operation, first and second four bit operands are provided to the four least significant first and second inputs of the carry lookahead circuit 12. Carry lookahead circuit 12 again generates eight carry bits. It is noted however that only the four least significant carry bits are relevant to the addition of the four bit operands with the fourth least significant carry bit ($c_4$) representing the carry out of the addition. The four least significant XOR gate 16 generate the four bit result from the four least significant carry bits of carry lookahead circuit 12 and the outputs of the four least significant XOR gates 14. In this mode, the second control signal is provided to multiplexer 18 which causes the fourth least significant carry bit provided by carry lookahead circuit 12 to pass to carry output node 20.

Multiplexer 18 adds signal propagation delay between the carry input node 22 and the carry output node 20. Typically, the propagation delay between carry input node 22 and carry output node 20 is the most critical in the operation of the adder circuit 10. It is desirable to remove as much delay in this critical path node to optimize the speed of adder circuit operation.

SUMMARY OF THE INVENTION

The problems identified above are in large part addressed by a method and circuit for adding first and second m bit operands without incurring added delay between a carry input and a carry output. The first m bit operand is inputted into m least significant first inputs of an n bit adder, where n is greater than m. The second m bit operand is inputted into the m least significant second inputs of the n bit adder. A first (n-m) bit operand is inputted into the (n-m) most significant first inputs of the n bit adder. Each bit of the first (n-m) bit operand represents logical zero. A second (n-m) bit operand is inputted into the most significant (n-m) second inputs of the n bit adder. Each bit of the second (n-m) bit operand represents a logical one. A carry input bit is provided to the carry input of the adder. The first and second m bit operands, the first and second (n-m) bit operands and the carry in bit are all inputted to the n bit adder in parallel. In response, the adder generates n carry bits and an n bit output operand. The least significant m bits of the n bit output operand and the most significant carry bit represent the result of adding the first and second m bit operands and the carry in bit.

One advantage of the present invention is that it operates faster than comparable adders of the prior art.

Another advantage of the present invention is that it reduces propagation delay between the carry input and the carry output exhibited in comparable adders of the prior art.

Another advantage of the present invention is that it eliminates complex circuitry for selecting adder generated carry out bits according to the size of the operands to be added.

BRIEF DESCRIPTION OF THE DRAWINGS

Other objects and advantages of the invention will become apparent upon reading the following detailed description and upon reference to the accompanying drawings in which.

Figure 1:
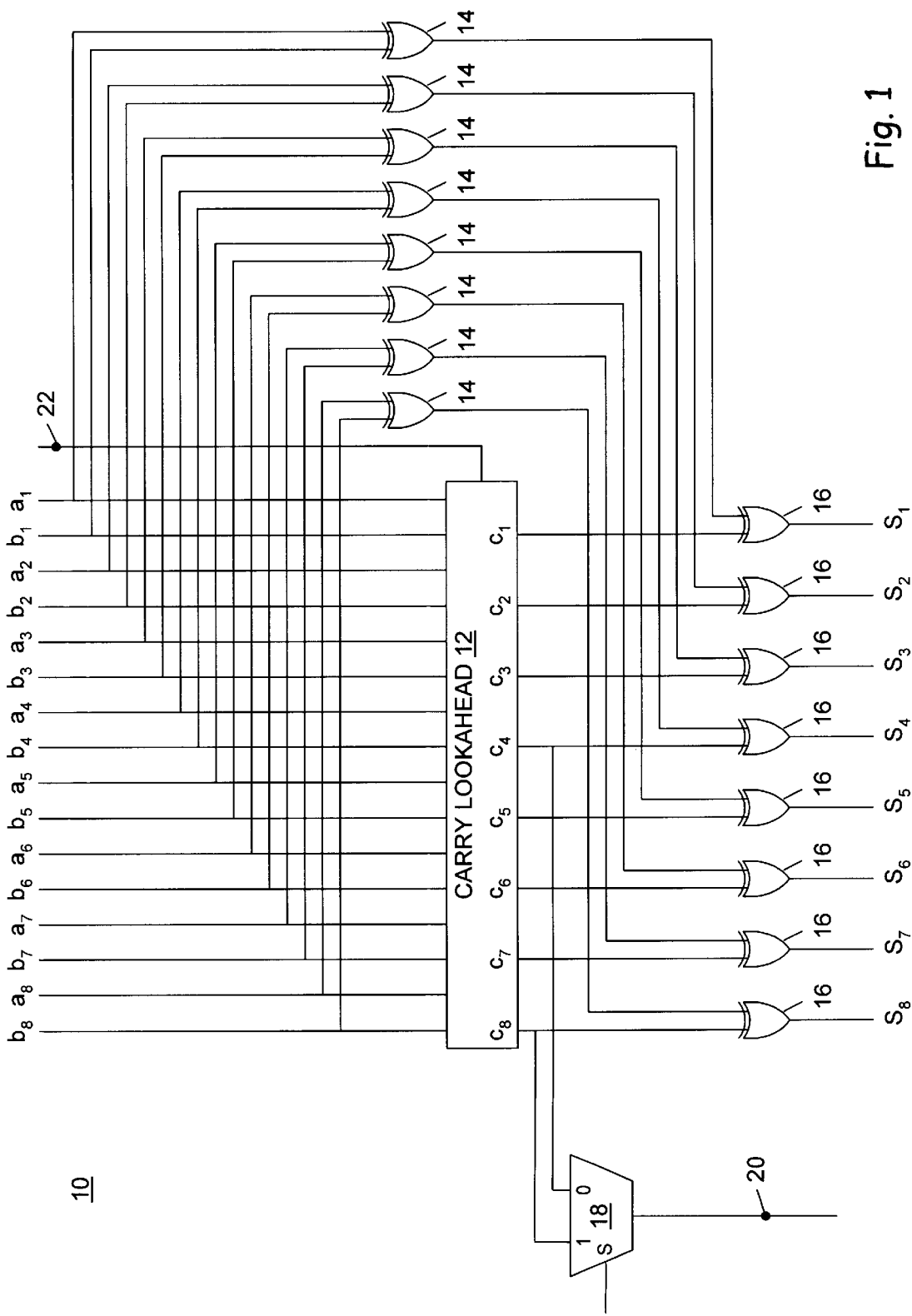
FIG. 1 is a schematic of a prior art adder for adding operands of multiple size.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
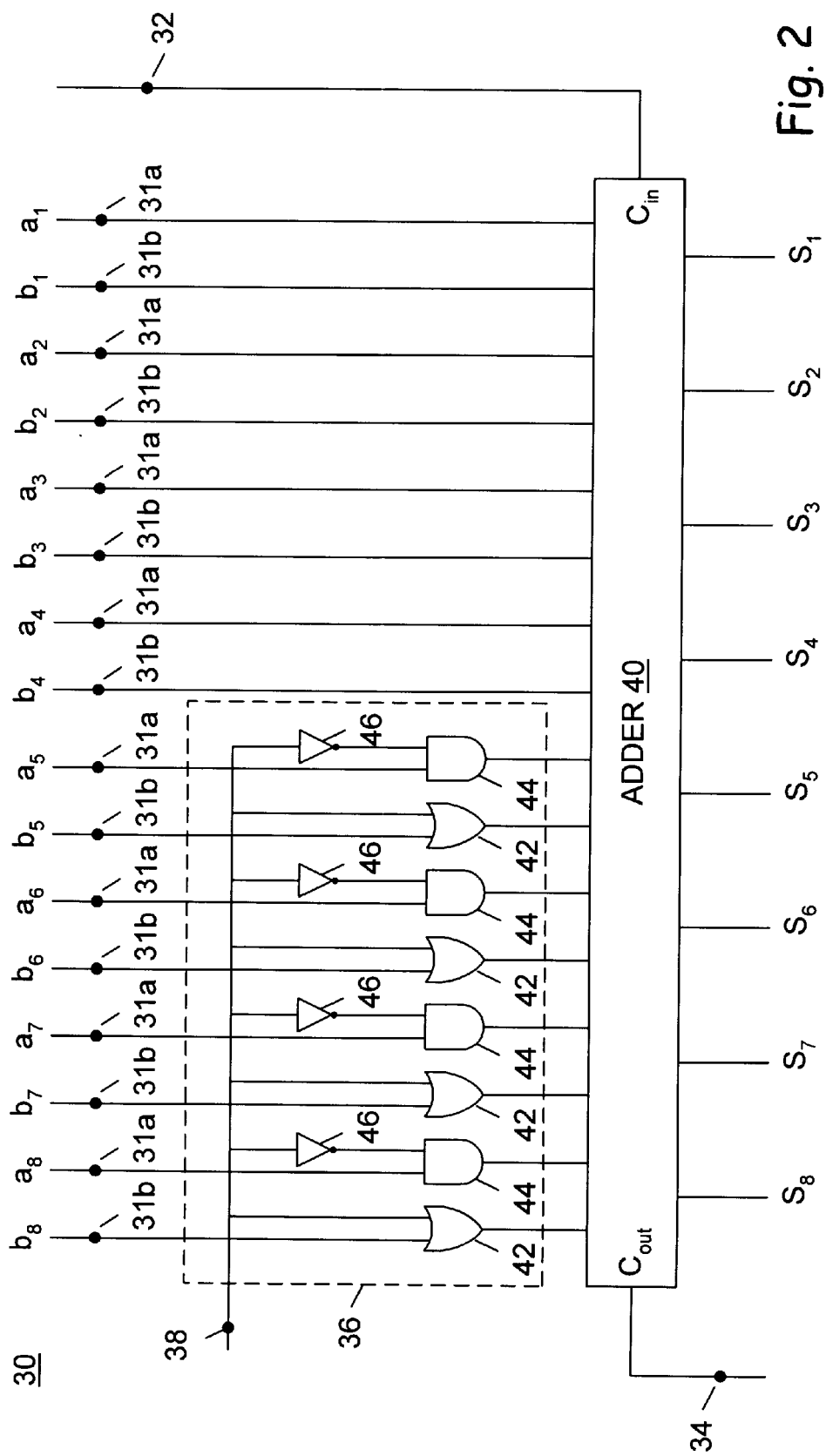
FIG. 2 is an adder circuit employing the present invention for adding operands of multiple sizes.

FIG. 2 is an illustration of an adder circuit 30 employing the present invention. Adder circuit 30 shown in FIG. 2 is configured for adding first and second four bit or eight bit operands. However, it is understood that the present invention should not be limited thereto. Rather, the present invention has application to adder circuits which can add operands of varying sizes such as 4, 8, 16 or 32 bits.

Adder circuit 30 includes eight first inputs 31a coupled to receive a first eight bit operand $a_{8:1}$ from circuitry (not shown), and eight second inputs 31b for receiving a second eight bit operand $b_{8:1}$ from circuitry (not shown), carry input node 32, eight outputs for generating an eight bit output operand $s_{8:1}$, and a carry output node 34. Adder circuit 30 further includes an adder configuration circuit 36 coupled to an adder configuration control node 38, and an eight bit adder 40. Adder 40 can take form in any one of well known eight bit adders including but not limited to ripple carry adders or carry lookahead adders.

Adder circuit 30 is configured to operate in one of two modes. In the first mode adder circuit 30 operates to add first and second four bit operands provided to the four least significant first and second input nodes, 31a and 31b, of adder circuit 30. In other words, a first four bit operand $a_{4:1}$ and a second four bit operand $b_{4:1}$ are provided to adder circuit 30. As can be seen, the two four bit operands are provided directly to the four least significant first and second inputs of adder 40. In this first mode, adder configuration control node 38 receives a first control signal (logical one). In response, adder configuration circuit 36 generates a pair of four bit operands which are provided to the four most significant first and second inputs of adder 40, respectively. More specifically, adder configuration circuit 36 provides one four bit operand to the four most significant first inputs of adder 4, wherein each bit of this operand represents a logical zero. Adder configuration circuit also provides another four bit operand to the four most significant second inputs of adder 40, wherein each bit of this operand represents a logical one. In response, adder 40 generates an eight bit output operand $s_{8:1}$ and a carry output bit which is provided to carry output node 34. Although not shown in FIG. 2, adder 40 is configured to generate eight carry bits ($c_{8:1}$) in the first mode, the most significant carry bit $c_8$ being provided directly to carry output node 34. The least four significant bits of the eight bit output operand $s_{8:1}$ represent the addition of the first and second input operands $a_{4:1}$ and $b_{4:1}$, and the carry in bit provided to carry input node 32. Moreover, the most significant carry bit $c_8$ provided to carry output node 34 is logically equivalent to the fourth least significant carry bit $c_4$ generated internally within adder 40.

In the second mode of operation, first and second eight bit operands $a_{8:1}$, and $b_{8:1}$ are provided to nodes 31a and 31b of adder circuit 30. The least four significant bits of the eight bit operands are provided directly to the least four significant first and second inputs of adder 40. The four most significant bits of the first and second operands are provided to the configuration circuit 36. In the second mode, the second control signal (logical zero) is provided to the adder configuration circuit 36. In response, adder configuration 36 operates to pass the four most significant bits of the first and second eight bit operands to the four most significant first and second inputs of adder 40. It is understood that a carry in bit is provided to carry input node 32 in this mode. In response, adder circuit 40 generates an eight bit operand and a carry out bit which represents the addition of the first and second eight bit operand, and the carry input bit. The carry out bit is provided to the carry output node 34 via the carry out of the adder. Adder 40 internally generates eight carry bits in the second mode, the most significant carry bit $c_8$ being provided to carry output node 34.

It is noted that in either the first or second modes of operation, adder circuit provides the most significant carry bit $c_8$ directly to carry output node 34. As such, adder circuit 30 shown in FIG. 2 does not require the multiplexer 18 shown in the prior art of FIG. 1. The lack of multiplexer for selecting the appropriate carry out bit, reduces the signal propagation delay between the carry input node 32 and the carry output node 34. Insofar as the critical path in adder circuit 30 is between the carry input and carry output nodes, adder circuit 30 operates at a speed which is faster when compared to the prior art shown in FIG. 1.

Adder configuration circuit 36 includes, in one embodiment, a set of four OR gates 42 each having a pair of inputs and an output coupled to one of the four most significant second adder inputs. One input of each OR gate is coupled to adder configuration control node 38 while the other input is coupled to one of the four most significant second input nodes 31b of adder circuit 30. Adder configuration circuit also includes, in one embodiment, a set of AND gates 44 having a pair of inputs and an output coupled to one of the four most significant first inputs of adder 40. One input of AND gate 44 is coupled to adder configuration control node 38 via inverter 46. The other input of AND gate 44 is coupled to one of the four most significant first input nodes 31a of adder circuit 30. As can be seen from FIG. 2, when control configuration node 38 receives the first control signal (logical one) each of the OR gates 42 provides a logical one to its corresponding second adder input, while each AND gate 44 provides a logical zero to its corresponding first adder input. It is to be understood, however, that adder circuit 36 should not be limited to that shown in FIG. 2. Rather, adder circuit 36 may take form in different types of circuits which provide, in response to receiving the first control signal, logical ones and logical zeros to the four most significant first and second adder inputs, respectively, or which passes, in response to receiving the second control signal, the four most significant bits of the eight bit first and second input operands $a_{8:1}$ and $b_{8:1}$ provided to the four most significant first and second input nodes of adder circuit 30, respectively. Moreover, the relative positions of each pair of OR circuits 42 and AND circuits 44 coupled to inverter 46, can be reversed such that in response to the configuration circuit 36 receiving the first control signal, logical zeros are provided to the four most significant second adder inputs and logical ones are provided to the four most significant first adder inputs.

Operation of the adder circuit 30 shown in FIG. 2 is best understood in connection with the following binary expressions. In particular, one of ordinary skill in the art will recognize that:

$$c_i + 0 + 1 = s_{i+1}, c_{i+1} = ci, \quad (6)$$

for each value of $c_i$. As a result, one of ordinary skill in the art would recognize:

$$
\begin{array}{rcccccccccc}
c_8 & = & c_4 & c_4 & c_4 & c_4 & c_4 & c_3 & c_2 & c_1 & c_{in} \\
 & & 0 & 0 & 0 & 0 & a_4 & a_3 & a_2 & a_1 \\
 & + & 1 & 1 & 1 & 1 & b_4 & b_3 & b_2 & b_1 \\
\hline
 & & s_8 & s_7 & s_6 & s_5 & s_4 & s_3 & s_2 & s_1
\end{array}
\quad (7)
$$

As can be seen from the above, the fourth most significant carry bit $c_4$ ripples through the above binary addition so that the most significant carry bit $c_8$ equals $c_4$. Adder circuit 30 shown in FIG. 2 implements expression (7) by providing the four most significant first and second adder inputs with logical ones and zeros, respectively, when adding first and second four bit operands $a_{4:1}$ and $b_{4:1}$.

Figure 3:
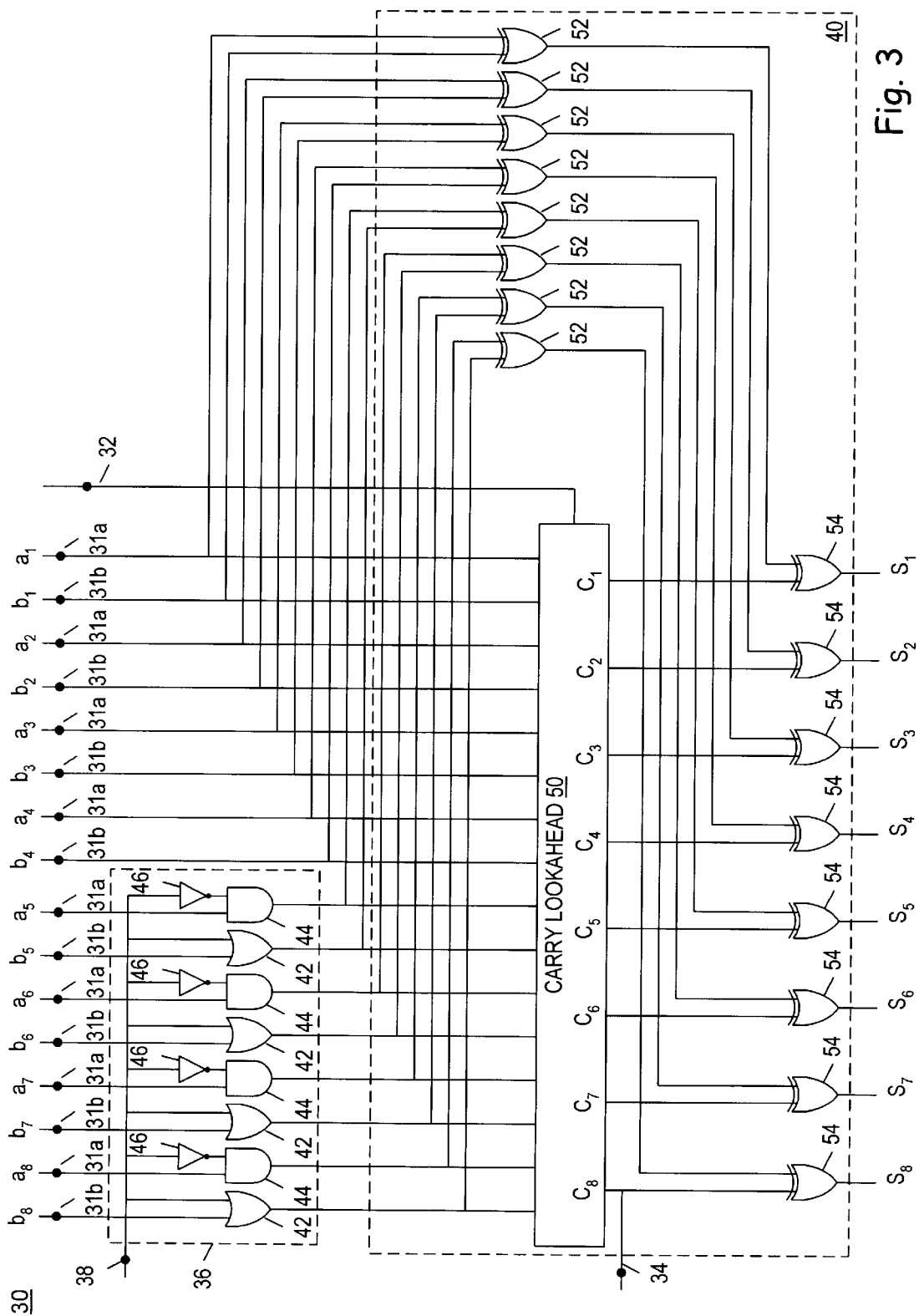
FIG. 3 is a carry lookahead adder circuit employing the invention for adding operands of multiple sizes.

FIG. 3 shows adder circuit 30 with adder 40 implemented as a carry lookahead adder. The carry lookahead adder includes a carry lookahead circuit 50 coupled to a first set of XOR gates 52 and a second set of XOR gates 54. Each XOR gate 52 has a pair of inputs coupled to a corresponding first and second inputs of adder 40, and an output coupled to an input of a corresponding XOR gate 54. The other input of each XOR gate 54 is coupled to receive a corresponding carry bit generated by carry lookahead circuit 50. The output of each XOR gate 54 provides one bit of the output eight bit operand $s_{8:1}$. Carry lookahead circuit 50 operates in accordance with equation (5) set forth above. Carry lookahead circuit 50 generates eight carry bits $c_{8:1}$ which are provided to the corresponding inputs of XOR gates 54. It is noted that the most significant carry bit $c_8$ is also coupled to the carry output node 34.

The adder circuit 30 shown in FIG. 3 operates in the first and second modes described above. In the first mode, the first control signal (logical one) is inputted to the configuration control node 38. In response adder circuit 40 adds four bit first and second operands $a_{4:1}$ and $b_{4:1}$ concatenated with the four bit operands provided by adder configuration circuit 36 to produce an eight bit output operand $s_{8:1}$ and a carry out bit where the carry out bit represents the most significant carry bit $c_8$ generated by the carry lookahead circuit 50.

When adder circuit 40 receives the second control signal (logical zero), the configuration circuit 36 passes the four most significant bits of the first and second eight bit operands $a_{8:1}$ and $b_{8:1}$ provided to adder circuit 30. In this mode, adder circuit operates as an eight bit adder producing an eight bit operand $s_{8:1}$ and a carry out bit where the carry out bit represents the most significant carry bit $c_8$ generated by the carry lookahead circuit 50.

While the present invention has been described with reference to particular embodiments, it will be understood that the embodiments are illustrative and that the invention scope is not so limited. Many variations, modifications, additions and improvements to the embodiment described are possible. These variations, modifications, additions and improvements may fall within the scope of the invention as detailed in the following claims.

What is claimed is:

1. A method of adding operands comprising the steps:

inputting a first m bit operand into m least significant first inputs of an n bit adder, where n is greater than m;

inputting a second m bit operand into m least significant second inputs of the n bit adder;

inputting a first (n-m) bit operand into the (n-m) most significant first inputs of the n bit adder, wherein each bit of the first (n-m) bit operand represents logical zero;

inputting a second (n-m) bit operand into the most significant (n-m) second inputs of the n bit adder, wherein each bit of the second (n-m) bit operand represents logical one;

inputting a carry in bit into a carry input of the adder;

wherein the first m bit operand, second m bit operand, first (n-m) bit operand, the second (n-m) bit operand, and the carry in bit are all inputted into the n bit adder in parallel;

generating a set of n carry out bits;

generating an n bit output operand, and;

wherein the least significant m bits of the n bit output operand and the most significant carry out bit represent a result of adding the first m bit operand, the second m bit operand, and the carry in bit.

2. The method of claim 1 further comprising the steps:

inputting a first n bit operand into the n first inputs of the n bit adder;

inputting a second n bit operand into the n second inputs of the n bit adder;

inputting a second carry bit into the carry input of the n bit adder;

wherein the first n bit operand, the second n bit operand, and the second carry bit are inputted to the adder in parallel;

generating a second n bit output operand at the n outputs of the n bit adder;

generating a second set of n carry out bits;

wherein the second n bit output operand and the most significant carry out bit of the second set carry out bits represent a result of adding the first n bit operand, the second n bit operand, and the second carry in bit.

3. A method of adding operands comprising the steps:

inputting a first m bit operand into m least significant first inputs of an n bit adder, where n is greater than m;

inputting a second m bit operand into m least significant second inputs of the n bit adder;

inputting a first (n-m) bit operand into the (n-m) most significant second inputs of the n bit adder, wherein each bit of the first (n-m) bit operand represents logical zero;

inputting a second (n-m) bit operand into the most significant (n-m) first inputs of the n bit adder, wherein each bit of the second (n-m) bit operand represents logical one;

inputting a carry in bit into a carry input of the adder;

wherein the first m bit operand, second m bit operand, first (n-m) bit operand, the second (n-m) bit operand, and the carry in bit are all inputted into the n bit adder in parallel;

generating a carry out bit at a carry output of the n bit adder;

generating an n bit output operand at n outputs of the n bit adder, and;

wherein the least significant m bits of the n bit output operand and the carry out bit represent a result of adding the first m bit operand, the second m bit operand, and the carry in bit.

4. The method of claim 3 further comprising the steps:

inputting a first n bit operand into the n first inputs of the n bit adder;

inputting a second n bit operand into the n second inputs of the n bit adder;

inputting a second carry bit into the carry input of the n bit adder;

wherein the first n bit operand, the second n bit operand, and the second carry bit are inputted to the adder in parallel;

generating a second n bit output operand at the n outputs of the n bit adder;

generating a second carry out bit at the carry output of the n bit adder;

wherein the second n bit output operand and the second carry bit represent a result of adding the first n bit operand, the second n bit operand, and the second carry in bit.

5. A circuit for adding operands of multiple size, the circuit comprising:

n first input nodes;

n second input nodes;

a control input node configured to receive a first or second control signal;

an adder circuit for adding a pair of n bit operands, the adder circuit comprising n first adder circuit inputs coupled to the n first input nodes, respectively, n second adder circuit inputs coupled to the n second input nodes, respectively, an adder circuit control input coupled to the control input node, an adder circuit carry input, an adder circuit carry output, and n adder circuit outputs, wherein the adder circuit generates n carry bits, wherein the $m^{th}$ carry bit results from adding the most significant $(m-1)^{th}$ carry bit and bits provided to the most significant $m^{th}$ first and second adder circuit inputs, and wherein the $n^{th}$ carry bit results from adding bits provided to the most significant $n^{th}$ first and second adder inputs and the most significant $(n-1)^{th}$ carry bit;

wherein, in response to the control node receiving the first signal, the $n^{th}$ carry bit is generated to be logically equivalent to the $m^{th}$ carry bit.

6. The circuit of claim 5 wherein the adder circuit comprises:

an adder having n first inputs, n second inputs, n outputs, a carry input, and a carry output, wherein the least significant m first inputs are coupled to the least significant first adder circuit inputs, wherein the least significant m second inputs are coupled to the least significant second adder circuit inputs, and;

an adder configuration circuit having q first configuration inputs coupled to the most significant q first adder circuit inputs, respectively, q second configuration inputs coupled to the most significant q second adder circuit inputs, respectively, q configuration outputs coupled to the most significant q adder inputs, respectively, and a configuration control input coupled to the adder circuit control input node.

7. The circuit of claim 6 wherein the adder configuration circuit comprises:

q first circuits coupled between the most significant q first configuration inputs and the most significant q first adder inputs, respectively, wherein each of the first circuits has a first circuit input coupled to the configuration control input, wherein each of the first circuits is configured to generate a bit representing a logical zero in response to the adder circuit control node receiving the first control signal, and wherein each of the first circuits is configured to generate a bit equivalent to a first operand bit provided to the corresponding first input node, and;

q second circuits coupled between the most significant q second configuration inputs and the most significant q second adder inputs, respectively, wherein each of the second circuits has a second circuit input coupled to the configuration control input, wherein each of the second circuits is configured to generate a bit representing a logical one in response to the adder circuit control node receiving the first control signal, and wherein each of the second circuits is configured to generate a bit equivalent to a second operand bit provided to the corresponding second input node.

8. A circuit for adding operands of multiple size, the circuit comprising:

n first input nodes;

n second input nodes;

a control input node configured to receive a first or second control signal;

an adder for adding a pair of n bit operands, the adder comprising n first adder inputs, n second adder inputs, a carry input, a carry output, and n adder outputs, wherein the least significant m first adder inputs are coupled to corresponding least significant m first input nodes, and wherein the least significant m second adder inputs are coupled to corresponding least significant m second input nodes;

q first circuits coupled between corresponding most significant q first adder inputs and most significant q first input nodes, wherein each of the first circuits has a first input coupled to the control node, wherein each of the first circuits is configured to generate a bit representing a logical zero in response to the control node receiving the first control signal, and wherein each of the first circuits is configured to generate a bit equivalent to a first operand bit provided to the corresponding first input node, and;

q second circuits coupled between corresponding most significant q second adder inputs and most significant q second input nodes, wherein each of the second circuits has a second input coupled to the control node, wherein each of the second circuits is configured to generate a bit representing a logical one in response to the control node receiving the second control signal, and wherein each of the second circuits is configured to generate a bit equivalent to a second operand bit provided to the corresponding second input node.

9. The circuit of claim 8 wherein each first circuit comprises an inverter and an AND gate having a pair of inputs, wherein the inverter is coupled between the first control node and one input to the AND gate, and wherein the other input of the AND gate is coupled to the corresponding first input node.

10. The circuit of claim 8 wherein each of the second circuits comprise an OR gate having a pair of inputs, wherein one of the OR gate inputs is coupled to the control input node, and wherein the other OR gate input is coupled to the corresponding second input node.

11. The circuit of claim 8 wherein each first circuit comprises a multiplexer having a selector input node coupled to the control input node, a first multiplexer input node coupled to the corresponding first input node, and a second multiplexer input node coupled to a first voltage representing logical zero.

12. The circuit of claim 8 wherein each second circuit comprises a multiplexer having a selector input node coupled to the control input node, a first multiplexer input node coupled to the corresponding second input node, and a second multiplexer input node coupled to a second voltage representing logical one.

13. The circuit of claim 8 wherein the wherein the adder generates n carry bits, wherein the $m^{th}$ carry bit results from adding the most significant $(m-1)^{th}$ carry bit and bits provided to the most significant $m^{th}$ first and second adder inputs, and wherein the $n^{th}$ carry bit results from adding bits provided to the most significant $n^{th}$ first and second adder inputs and the most significant $(n-1)^{th}$ carry bit.

14. The circuit of claim 4 wherein $n^{th}$ carry bit is equal to $m^{th}$ carry bit.

15. A circuit for adding operands of multiple size, the circuit comprising:

n first input nodes;

n second input nodes;

a control input node configured to receive a first or second control signal;

an adder for adding a pair of n bit operands, the adder comprising n first adder inputs, n second adder inputs, a carry output, and n adder outputs, wherein the least significant q first adder inputs are coupled to corresponding least significant q first input nodes, and wherein the least significant q second adder inputs are coupled to corresponding least significant q second input nodes;

q first circuits coupled between corresponding most significant q first adder inputs and most significant q first input nodes, wherein each of the first circuits has a first input coupled to the control node, wherein each of the first circuits is configured to generate a bit representing a logical one in response to the control node receiving the first control signal, and wherein each of the first circuits is configured to generate a bit equivalent to a first operand bit provided to the corresponding first input node, and;

q second circuits coupled between corresponding most significant q second adder inputs and most significant q second input nodes, wherein each of the second circuits has a second input coupled to the control node, wherein each of the second circuits is configured to generate a bit representing a logical zero in response to the control node receiving the second control signal, and wherein each of the second circuits is configured to generate a bit equivalent to a second operand bit provided to the corresponding second input node.

* * * * *

UNITED STATES PATENT AND TRADEMARK OFFICE
CERTIFICATE OF CORRECTION

PATENT NO. : 6,041,341
DATED : March 21, 2000
INVENTOR(S) : Eric W. Mahurin

It is certified that error appears in the above-indentified patent and that said Letters Patent is hereby corrected as shown below:

Claim 14, col. 10, line 12, please delete "4" and substitute --13--.

Signed and Sealed this

Tenth Day of April, 2001

Attest:

NICHOLAS P. GODICI

Attesting Officer

Acting Director of the United States Patent and Trademark Office